No. 692,397. Patented Feb. 4, 1902.
C. H. WILKINSON.
NON-SLIPPING WEARING TREAD OR COVERING.
(Application filed Jan. 10, 1901.)
(No Model.)
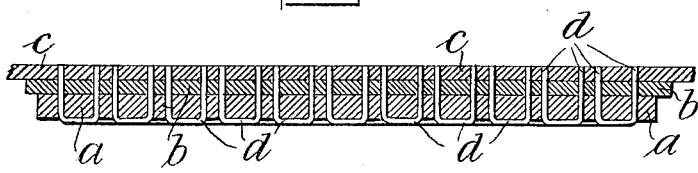
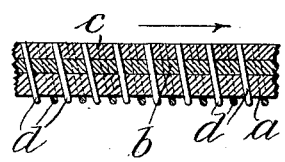
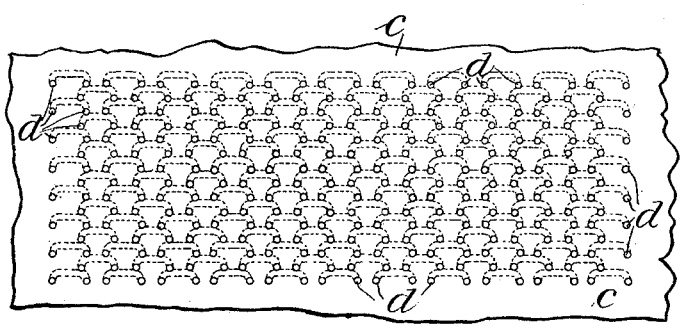
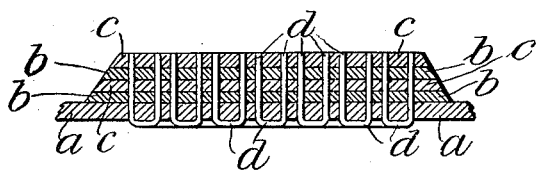
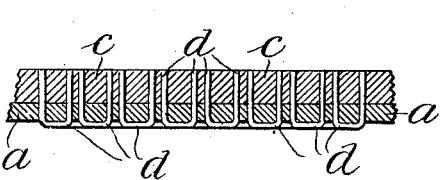
Witnesses:
Inventor:
Charles H. Wilkinson
by Herbert W. T. Jenner.
Attorney.
THE NORRIS PETERS CO., PHOTO-LITHO., WASHINGTON, D. C.

United States Patent Office.

CHARLES H. WILKINSON, OF HUDDERSFIELD, ENGLAND.

NON-SLIPPING WEARING TREAD OR COVERING.

SPECIFICATION forming part of Letters Patent No. 692,397, dated February 4, 1902.

Application filed January 10, 1901. Serial No. 42,779. (No model.)

*To all whom it may concern:*

Be it known that I, CHARLES HENRY WILKINSON, a subject of the Queen of Great Britain, residing at Huddersfield, in the county of York, England, have invented certain new and useful Improvements in Non-Slipping Wearing Treads or Coverings; and I do hereby declare the following to be a full, clear, and exact description of the invention, such as will enable others skilled in the art to which it appertains to make and use the same.

This invention relates to wearing treads, pads, or coverings for cycle or vehicle tires, stair-treads, horseshoe-pads, footways or foot-wear, and other similar wearing surfaces or treads.

The object of my invention is to produce a wearing tread, pad, or cover which will afford a good foothold or grip upon the surface or track walked upon or ridden over, prevent side slipping or skidding, and puncture of air-tubes when applied thereto and which will be practically indestructible.

My invention consists in the novel combination and construction of wearing tread or covering, as hereinafter fully described and claimed.

In the accompanying drawings, Figure 1 is a cross-section, on a magnified scale, showing a light construction of my improved non-slipping tread or cover, such as is more particularly intended to take the place of the ordinary covers which inclose and secure the air-tubes of pneumatic tires in the rims of cycle-wheels. Fig. 2 is a longitudinal section of a fragment of the tread or cover. Fig. 3 is a plan view of Fig. 1. Fig. 4 is a cross-section of a stronger or stouter construction of tread or cover suitable for covering the solid-rubber tires on vehicle or motor-car wheels, or for horseshoe-pads, or analogous purposes; and Fig. 5 is a cross-section of the construction adopted when the tread is composed of lead or other soft metal, or of leather, hide, or skin, or of a thick solid block of india-rubber.

Referring to the drawings and to Figs. 1, 2, and 3, letter *a* designates a base or foundation of rubber-covered canvas, or filleting, or of plain canvas or strong stout fabric; *b*, a layer of insertion-cloth placed upon the base or foundation *a*, and *c* a thin sheet of india-rubber to form the tread or cover, which, if intended for a covering for pneumatic tires, is made the required width to pass over the air-tube and extend to the inside of each edge of the rim to be secured therein in the usual way.

The rubber cover *c*, intermediate layer of insertion-cloth *b*, and base or backing *a* are solutioned together, and throughout the whole length of same and across the width of the portion forming the tread I pierce or set through from *a* to *c* successive rows of flexible wire teeth *d*, whose points come flush or are subsequently ground flush with the surface of the tread or cover *c*. These wire teeth are inserted closely together transversely and lengthwise of the tread, in the form of staples, in a similar manner to that in which card-teeth are set and secured to card-fillets or card-clothing, and the same or a similar machine is employed for the purpose.

The teeth *d* are preferably set at a slight angle, as shown at Fig. 2, and in fixing it in position on the rim of the wheel the cover, which is made endless as an ordinary cover, is placed thereon, with the teeth pointing in a direction away from that in which the wheel revolves in running, as indicated by arrow in Fig. 2, so that the said teeth will give more readily and easily to pressure.

The teeth are composed of steel or other suitable wire, and they are depressible with the cover or tire and spring back instantly on pressure being removed, so that in resilience and quickness the tire is not affected. The points of the teeth wear down with the cover *c*, which will therefore withstand greater wear and last considerably longer than ordinary rubber covers, said teeth also affording a firmer grip or purchase on the track and preventing side slip, while especially, by reason of the staple form of the teeth, the liability of any sharp instrument penetrating through the cover and puncturing the air-tube is minimized.

In Fig. 4 the construction of the tread or cover is modified by superimposing two or more layers of insertion-cloth *b b* and two or more layers of india-rubber *c c* alternately one above the other upon the backing or foundation *a* and solutioning the whole together, the teeth *d* being inserted or pierced through same, as shown and as described with reference to Figs. 1, 2, and 3. This construction of tread is adapted for covering solid india-rubber tires on vehicle or motor-car wheels, where a thicker tread is necessary, and it may also be cut up into pads to fit within horses' shoes over the frog of the hoof in place of the usual rubber pads.

For stair-treads, footways, or footwear and analogous wearing-surfaces, where leather, lead, or thick blocks of rubber are commonly employed as a wearing-surface or foothold, the construction shown at Fig. 5 may be adopted, the tread or covering $c$, of lead, leather, or rubber, having a backing or foundation $a$, of cloth, felt, or other soft or yielding material, through which and through the lead, leather, or rubber tread $c$ the teeth $d$ are pierced, as before described.

Having thus described my invention, what I claim is—

A wearing-tread formed of elastic material, and provided with a series of depressible spring-wires arranged at an angle to its front or wearing surface and falling and rising simultaneously with it, said wires being fastened at the back of the tread and extending through it and having their free ends arranged flush with its front surface, substantially as set forth.

In testimony whereof I hereunto affix my signature in presence of two witnesses.

CHARLES H. WILKINSON.

Witnesses:
HERBERT HANSON,
THOMAS H. BARRON.